A. GERDES.
MACHINE FOR STRIPPING AND TOPPING CANE, CORN, &c.
APPLICATION FILED FEB. 4, 1910.

1,009,233.

Patented Nov. 21, 1911.

4 SHEETS—SHEET 2.

A. GERDES.
MACHINE FOR STRIPPING AND TOPPING CANE, CORN, &c.
APPLICATION FILED FEB. 4, 1910.

1,009,233.

Patented Nov. 21, 1911.

4 SHEETS—SHEET 3.

A. GERDES.
MACHINE FOR STRIPPING AND TOPPING CANE, CORN, &c.
APPLICATION FILED FEB. 4, 1910.

1,009,233.

Patented Nov. 21, 1911.
4 SHEETS—SHEET 4.

Witnesses
J. G. Finkel
Milton Ottenberg

Inventor
August Gerdes
by
Foster Freeman Watson & Cole
Attorneys

UNITED STATES PATENT OFFICE.

AUGUST GERDES, OF GRETNA, LOUISIANA.

MACHINE FOR STRIPPING AND TOPPING CANE, CORN, &c.

1,009,233. Specification of Letters Patent. Patented Nov. 21, 1911.

Original application filed May 11, 1909, Serial No. 495,289. Divided and this application filed February 4, 1910. Serial No. 542,101.

*To all whom it may concern:*

Be it known that I, AUGUST GERDES, a subject of the German Emperor, and resident of Gretna, Jefferson parish, State of Louisiana, have invented certain new and useful Improvements in Machines for Stripping and Topping Cane, Corn, &c., of which the following is a specification.

This invention relates to harvesters for cane, corn and broom corn, and particularly to the stripping and topping mechanisms.

This application is a division of my copending application, Serial Number 495,289, filed May 11, 1909.

One of the objects of this invention is to construct a stripper which will thoroughly strip the stalk of the leaves.

Another object is to construct a topper which will cut off the tops, but at the same time will prevent undue waste by cutting off no more than the necessary amount of the stalk.

Further objects will appear from the detailed description.

The invention will be described in connection with the accompanying drawings, in which—

Figure 1:
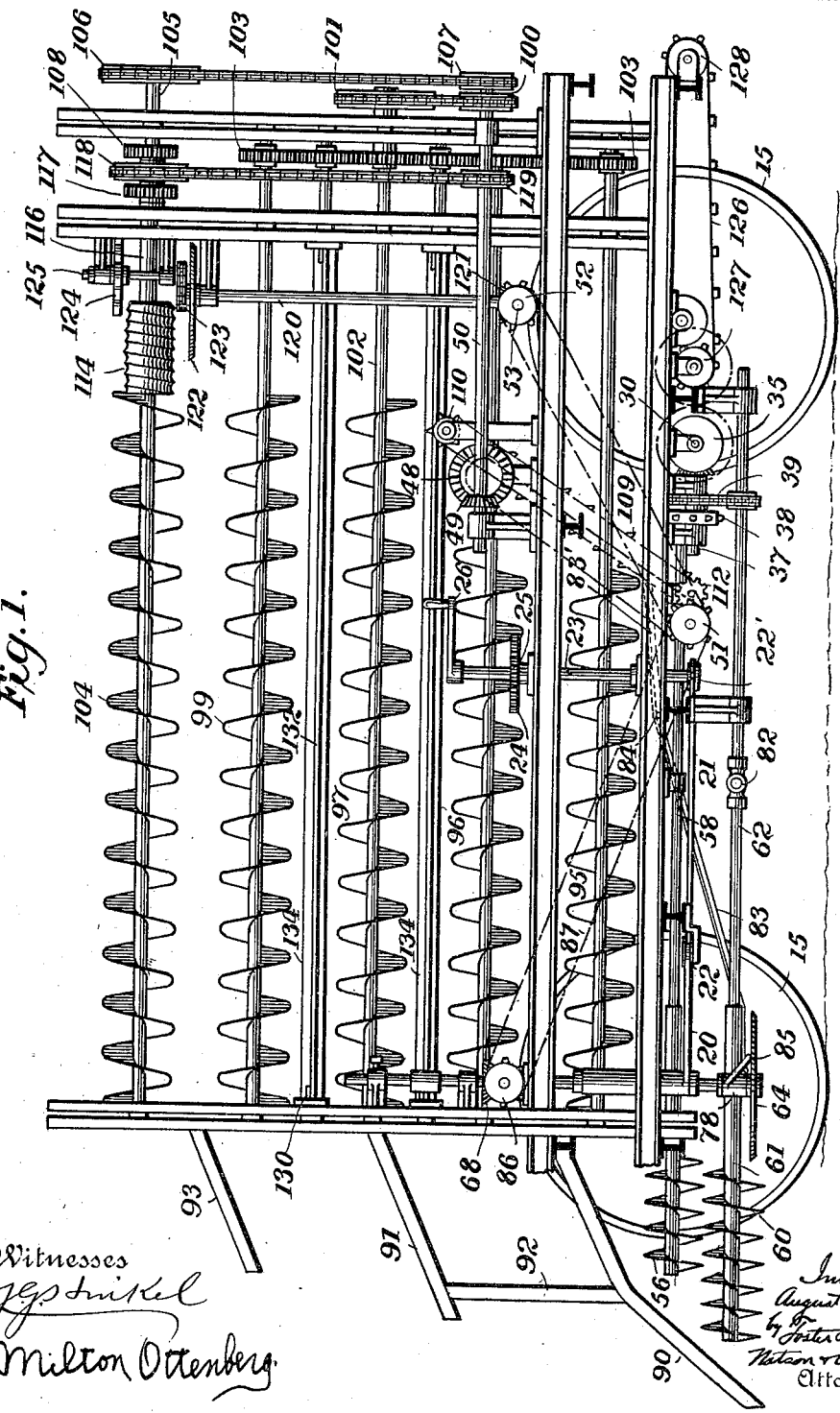
Figure 2:
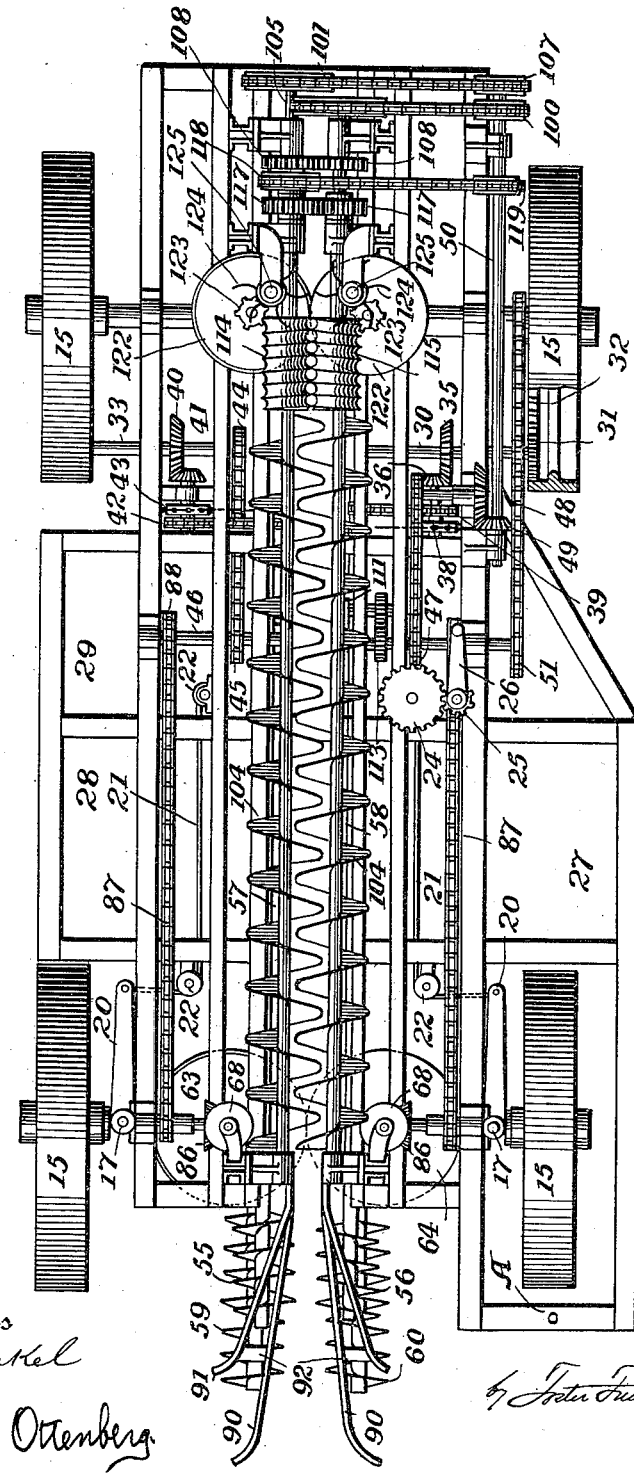
Figure 3:
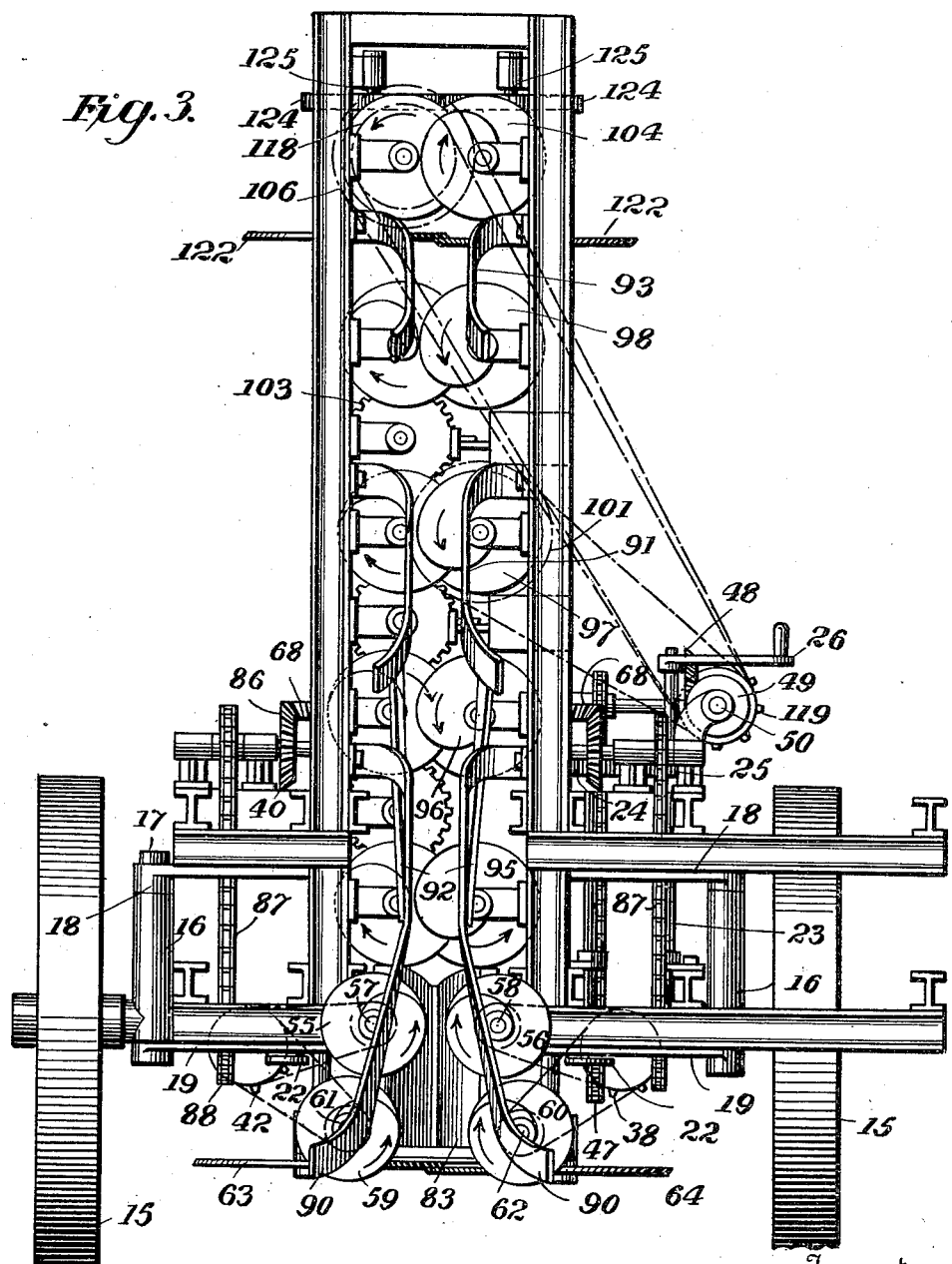
Figure 4:
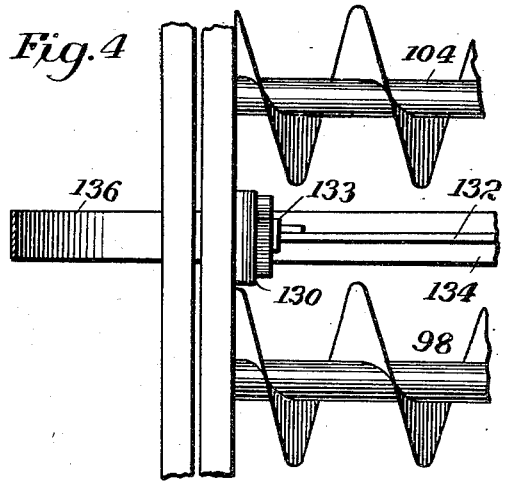
Figure 5:
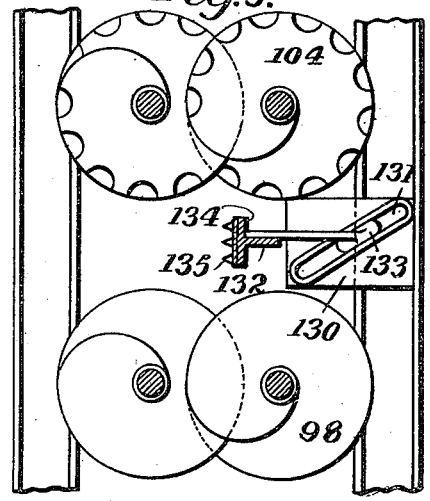
Figure 6:
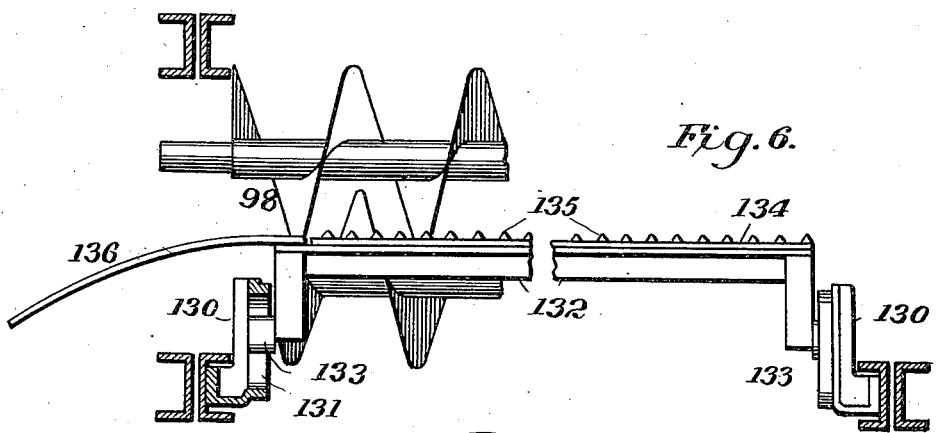
Figure 7:
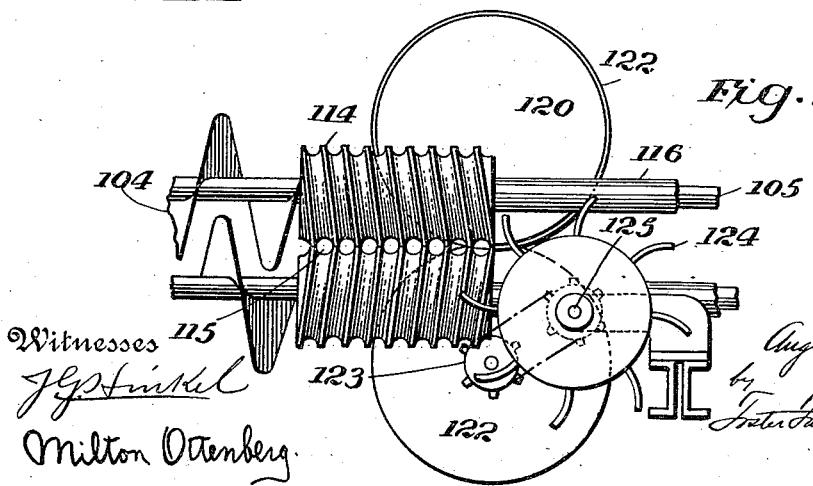

Figure 1 is a side elevation of the harvester; Fig. 2 is a plan view; Fig. 3 is a front elevation; Fig. 4 is a detail of the stalk revolving bar in side elevation; Fig. 5 is a detail front elevation of the same; Fig. 6 is a detail plan view of the same; and Fig. 7 is a detail plan view of the feeding screws, the top cutting knives and the doffer wheel.

The invention is shown as applied to a machine of the traveling type—that is, one which will take the stalks standing in the field and cut, strip and top the same. It is obvious, however, that this invention may be applied to stationary machines which operate upon stalks cut by another machine and transported and fed to the stationary machine. The frame of the machine is preferably formed of structural steel and supported on four wheels 15. The front wheels, as clearly shown in Fig. 3, are mounted upon bearings attached to sleeves 16, which are pivotally mounted on pivot pins 17 mounted in bearings 18, 19, rigidly connected to the frame of the machine. Rigidly connected to the sleeves 16 are arms 20. A band or chain 21 passes around a number of loose pulleys 22 and pulley 22' on a shaft 23 mounted in bearings in the frame. This shaft has connected to it a spur gear 24 with which meshes a pinion 25 having connected to it a handle 26. The handle 26 and the coöperating parts constitute the steering mechanism for the machine. This machine may be drawn either by animal power or propelled by an engine. If drawn by animal power the tongue is attached on the left side of the machine at the point A. If propelled by an engine, this engine is mounted in the space 27.

28, 29 forms spaces for tanks and tool boxes.

Across the frame of the machine extends the main shaft 30, having mounted upon it a pinion 31, which meshes with an internal gear 32 on the rear wheel rim. Rear wheels 15, 15 are loosely mounted on their axles in the usual way. The shaft 30 may be driven either by internal teeth on one of the rear wheel rims or this shaft may extend clear across, forming an extension 33 which may be provided with another pinion meshing with internal gear teeth on the right-hand rear wheel rim. In this case, however, a suitable differential gearing must be provided. When the machine is propelled by an engine a chain wheel may extend from the engine shaft to the main shaft 30 to propel the same. This chain wheel is, however, dispensed with when the machine is drawn by animal power.

The main shaft 30 is provided with a bevel gear 35 meshing with a bevel pinion 36 upon a stub shaft 37. Upon this stub shaft are mounted a pair of chain wheels 38, 39. A second bevel gear 40 on the main shaft 30 meshes with a bevel pinion 41 upon a stub shaft upon which are mounted a pair of chain wheels 42, 43. A chain wheel 44 is mounted on the main shaft 30 and transmits power by means of a chain to a chain wheel 45 connected to a counter shaft 46. A chain wheel 47, mounted upon the shaft 46, transmits, by means of a chain, power to a stub shaft having mounted upon it a bevel gear 48, as shown in Figs. 1 and 2. This bevel gear 48 meshes with a pinion 49 on a shaft 50, extending longitudinally of the machine frame. A chain wheel 51 on the shaft 46 transmits power to a chain wheel 52 on a shaft 53. It will therefore be seen that by means of the gears and chain wheels the power is transmitted from the main shaft to the different counter shafts, each of which, as will be seen later, transmits the power to its separate pieces of mechanism.

A pair of gathering screws 55, 56 are mounted upon their shafts 57, 58, which shafts rotate in bearings in the frame of the machine. Upon these shafts are mounted a pair of chain wheels which connect by chains to the chain wheels 38 and 42, whereby the gathering screws are rotated in opposite directions, as indicated by the arrows in Fig. 3. A second pair of gathering screws 59, 60, are mounted upon a pair of shafts 61, 62 so as to also rotate. The shafts 61, 62 have universal joints 82. These shafts 61, 62 extend longitudinally of the frame, as shown in Fig. 1, and are rotated in the direction of the arrows shown in Fig. 3 by means of chain wheels 39, 43 and chains. A pair of disk knives 63, 64 are mounted in bearings in the position shown in Fig. 3 and cut the stalks fed to them by the gathering screws 55, 56, 59 and 60.

The disk knives are mounted upon shafts 65 driven by means of bevel gears 68 and 86, chains 87 and chain wheels 88 on shaft 46. A platform or bridge 83 is hinged at its upper end at 84 by a suitable pivot pin or any other form of hinge and rests at its lower end upon rounded bearing lugs 85 formed upon collars 78. Collars 78 are provided with bearing lugs for shafts 62. The shafts 65 and collars 78 are arranged to be adjusted vertically to adjust the position of the knives gathering screws and platform, as shown in my copending application.

Upon the front of the machine are mounted pairs of gathering bars 90, 90, 91, 91, connected by strips 92, 92. An additional pair of guide bars 93, 93 may be mounted at the upper end of the machine to guide the stalks into engagement with the conveyers and strippers as hereafter described.

Referring to Figs. 1, 2 and 3: 95, 95, 96, 96, 97, 97 and 98, 98 designate combined conveyer and stripper mechanism in the form of screws or helices 99. As shown these screws are mounted in pairs one above the other, the pairs intermeshing, as shown in Fig. 2, so as to form an open space between the spirals for the passage of the stalks. These helices or screws are provided with sharp cutting edges, either plain, as shown in Figs. 1, 2 and 3, or notched in the form of saw-teeth, as shown in Fig. 5. These screws rotate in opposite directions and as shown by the arrows in Fig. 3, downwardly toward the bottom of the stalk. A chain wheel 100 upon shaft 50 transmits power to a chain wheel 101 on a shaft 102 supporting one of the screws. The power is transmitted to the other screws by means of a train of gearing 103, as shown in Fig. 1. A fifth pair of screws or helices 104 are mounted above the other screws upon shafts 105. A chain wheel 106 upon one of these shafts connects by a chain to the second chain wheel 107 upon the shaft 50. By means of spur gears 108 on the shafts 105, 105, and the chain wheel 107, the screws 104 are rotated in opposite directions, as shown by the arrows in Fig. 3. In this case however the direction of rotation is upwardly or toward the top of the stalk. The screws 104 need not be provided with cutting edges as their function is merely to support a stalk and not to strip it. The inclined bridge 83 has an extension 83' which extends to and feeds the stalks upon a steep conveyer 109 passing over rolls 110, 111. The roll 111 is mounted upon a shaft to which is connected a spur gear 112, meshing with a spur gear 113 on the shaft 46, whereby during the operation of the machine the elevator moves the stalks toward the rear of the machine. It will be noted that the length of the screw portion of the screws 95 and 96 is diminished.

Referring to Figs. 1, 2 and 7, a pair of feeding screws 114 forming stalk receiving recesses 115 are mounted upon sleeves 116, through which sleeves extend the shafts 105. Upon these sleeves are rigidly mounted a pair of intermeshing spur gears 117, and upon one of the sleeves is mounted a chain wheel 118 connected by means of a chain to a chain wheel 119 upon the shaft 50. By means of this independent connection the feeding screws 114 may be driven at a greater or at a less speed than the screws 104. A pair of vertically extending shafts 120 have mounted at their lower ends a pair of bevel gears 121 which mesh with bevel gears upon the shaft 53. Upon the upper ends of the shafts 120 are mounted a pair of disk knives 122. A pair of chain wheels 123, mounted above the disks 122, are connected by chains to a pair of chain wheels upon shafts 125. These shafts support a pair of doffer wheels 124. In the construction shown in Fig. 7 only one doffer wheel is used. A conveyer 126 passes over a pair of rollers 127, 128. The roller 127 has mounted upon its shaft a spur gear which coöperates with a spur gear on the main shaft 30.

In Figs. 3, 4, 5 and 6 are shown the construction of the stalk revolving bars. Since the construction of both bars are identical only one will be described. Referring to Figs. 4, 5 and 6, 130, 130 designate a pair of brackets provided with inclined slots 131. A longitudinally extending bar 132 is provided with a pair of slides or elongated pins 133 which slide in the inclined slots 131. The bar 132 has riveted or otherwise secured to it a plate 134 provided with a number of corrugations 135 extending along the entire length of the bar. These corrugations may be formed in various ways. They may be formed by punching out portions of the plate or strip 134, or by securing sharp pins directly in the bar 132, or the bar 132, or the plate 134, may be merely roughened, the function of this roughened portion being to revolve the stalk in its passage through the machine. The bar 132 is preferably provided with a flaring guide 136 for the purpose of bringing the stalk in engagement with the roughened projections 135. Referring to Figs. 3 and 5, it will be noted that the bars 132, which are two in number in the construction shown, are positioned between two pairs of screws. The weight of the bar normally retains them in the lowest position with the lugs 133 in the lower ends of slots 131. In this lowest position the bars 132 will extend beyond the center line of the machine, this being the line which is equidistant from the centers of the screws.

The operation of the machine is as follows: The machine is propelled or drawn along a row of cane or corn. The gathering bars 90 and 91 will pick up the stalks which have been blown down by the wind or rain and bring them into the bite of the gathering screws 55, 56, 59 and 60. These gathering screws are revolved at such a speed that the pitch speed is equal to the speed of the machine over the ground, the pitch speed being the distance between two symmetrical points on two successive flights, *i. e.* the pitch, multiplied by the number of revolutions of the screw in a unit of time. It will therefore be seen that after a stalk is once in engagement with the screw it will be righted and held in vertical position, the lower pair of screws first righting the stalk and the upper pair of screws completing the righting operation. By the united operation of the gathering bars and the gathering screws the stalks are gradually brought closer to the center line of the machine, since it will be noted that the upper pair of gathering screws is located nearer the center line than the lower pair, thereby corresponding with the flare of the gathering bars. The gathering screws and gathering bars feed the stalks to the cylindrical knives 63, 64, which cut off the stalk. At the same time that the stalks are in engagement with the cutting knives the upper portions thereof, by means of the gathering bars 91 and the additional guides 93, are guided onto the bite of the revolving screws 99 which engage the stalks which are now righted and in vertical position; hold them in vertical position, and gradually move them through the machine. As the stalks are moved through the machine the sharp cutting edges of the screws strip the stalks of their leaves by a draw cut. After the stalks leave the knives 63 and 64 they are engaged by the inclined platform or bridge 83. Referring to Fig. 3, it will be noted that this platform or bridge 83 rests upon the surface of the knives and is provided with a trough or V-shaped central portion B, which tends to hold the stalks in central position. The stalks moved on by the conveyer and stripping screws are moved longitudinally and upwardly, due to the incline of the platform or bridge 83. In this manner by giving the stalks an upward movement while engaged by the strippers it is insured that every part longitudinal of the stalk shall be engaged by the stripping knives. The incline of the platform 83 is of course suitably proportioned so that a vertical movement of sufficient amount is given to insure such operation. In their passage through the machine the stalks are also engaged by the roughened bars 132. In this way the stalks are given a rotative movement around their vertical axis while they are moved through the machine whereby it is insured that every part of the stalk will be engaged by the stripping knives. By providing the screws, which are the conveyers themselves, with cutting edges a construction is secured whereby during the stripping operation the strippers are constantly in engagement with the stalks. In this way all tearing and breaking of the stalks is prevented and only the leaves removed.

In the passage of the stalks through the machine the tops of the long stalks are engaged by the retaining screws 104. It will be noted that these screws rotate upwardly toward the top of the stalk and therefore any top coming in engagement will be quickly moved upwardly and thereafter retained in position by the screws which form a rest or stop for the stalk, and since they engage the stalk by the top or tassel, all downward movement and further upward movement is prevented. Since the function of these screws is merely to retain or support the stalk they need not be provided with cutting edges, and, on the other hand, they may be in the form of plain rolls.

The inclined platform or bridge 83 will move the long stalks into engagement with the retaining screws or rolls 104 but in order that the short stalks may also be moved into engagement with these rolls the elevator 109 is provided. The section 83' of the bridge or platform discharges onto this elevator 109 which moves the stalks upwardly, the speed of the elevator being such that the longitudinal component is the same as the feed of the screws. In this way the shorter stalks are elevated so that they are engaged by the retainers 104 and the stalks are supported by the head or tassel in the usual way. The stripping screws and the retaining screws or rolls 104 move all the stalks rearwardly into the bites of the feeding screws 114, which rotate in the same directions as the retaining screws or rolls 104. The stalks will now enter the recesses 115 in the feeding rolls and will be moved in engagement with the disk knives 122. The feeding rolls 114 are preferably run at such a speed that the movement of the stalk, after being engaged by them, toward the knives is faster than the movement which is imparted to the stalk by the stripping and retaining screws. In this way after a stalk is fed into engagement with the rolls 114 it is quickly moved toward the knives 122 and thus all clogging is avoided. Since the rolls 114 move upwardly and toward the top or tassel the stalk is supported by the tassel and therefore the knives 122 cut the stalk at a predetermined and uniform distance below the top, which distance is independent of the length of the stalk.

By referring to Fig. 1 it will be noted that the elevator 109 terminates at a point in front of the last thread or helix on the screws 97 and 98. In this way the stalks will leave the elevator before they enter the recesses in the feeding rolls 114, and are allowed to drop down and be supported by their heads or tassels only and thus insure that the head shall always be a predetermined distance above the knives 122. Although the rolls 114 are preferably driven by a separate train of gearing in order that they may be driven at a higher speed and thereby prevent clogging, these rolls may be rigidly connected to the shafts 105 and thus the separate train of gearing 117, 118, 119 may be dispensed with. After the tops have been cut off the stalks are discharged upon the elevator 126 which may load them upon a wagon or discharge them on the ground while the tops are discarded by means of the doffer wheels 124. In the construction shown in Fig. 7 the doffer wheels throw the tops on that part of the field which has been cleaned of the stalks. By the adjusting means disclosed in my copending application the distance of the knives, the gathering screws, and the inclined bridge 83 above the ground may be adjusted.

Although this machine is particularly adapted to cut, strip and top sugar cane it will be obvious that the machine can be used for cutting and stripping corn to prepare it for the cellulose and paper factories. It is therefore to be understood that I do not intend to limit the use of this machine to a particular kind of stalk, nor is this invention to be limited to the specific construction shown and described.

Having thus described the invention, what is claimed is:

1. In a machine of the class described, the combination with a frame, of stripper mechanism thereon including a rotatable helical member adapted to constantly engage with the stalk during the stripping operation.

2. In a machine of the class described, the combination with a frame, of stripper mechanism thereon including a rotatable edged helical member.

3. In a machine of the class described, the combination with a frame, of stripper mechanism thereon including a helical member provided with a serrated cutting edge.

4. In a machine of the class described, the combination with a frame, of stripper mechanism thereon including axially rotatable intermeshing members provided with cutting edges.

5. In a machine of the class described, the combination with a frame, of stripper mechanism thereon including intermeshing helical members rotating in opposite directions toward the bottom of the stalk, said helical members being constructed to leave a clearance space between them for the stalk.

6. In a machine of the class described, the combination with a frame, of stripper mechanism thereon including intermeshing helical members provided with cutting edges and constructed to leave a clearance space for the stalks, and means for rotating said members to move the stalks toward the rear of the machine.

7. In a machine of the class described, the combination with a frame, of stripping mechanism thereon comprising pairs of intermeshing helical members located one pair above the other, constructed to leave a clearance space between pairs for the stalks.

8. In a machine of the class described, the combination with a frame, of stripping mechanism thereon including intermeshing members constantly in engagement with the stalk during the stripping operation, means for feeding the stalk transversely of its length through the machine, and means for imparting a compound movement to the stalk in the direction of its length while engaged by said members.

9. In a machine of the class described, the combination with a frame, of stripper mechanism thereon including a member constantly in engagement with the stalk during the stripping operation, and means for rotating the stalk around its axis while engaged by said member.

10. In a machine of the class described, the combination with a frame, of stripper mechanism thereon including intermeshing members constantly in engagement with the stalk during the stripping operation, and means for rotating the stalk around its axis while engaged by said members.

11. In a machine of the class described, the combination with a frame, of stripper mechanism thereon including a member constantly in engagement with the stalk during the stripping operation, means for feeding the stalks through the machine, and an upwardly and rearwardly inclined platform upon which the stalks are adapted to rest in their movement.

12. In a machine of the class described, the combination with a frame, of stripper mechanism thereon including intermeshing members constantly in engagement with the stalk during the stripping operation and constructed to feed the stalks through the machine, and an upwardly and rearwardly inclined platform upon which the stalks are adapted to rest in their movement.

13. In a machine of the class described, the combination with a frame, of stripper mechanism thereon, and means for rotating the stalk around its axis during the stripping operation.

14. In a machine of the class described, the combination with a frame, of stripper mechanism thereon, means for moving the stalk in the direction of its length, and means for rotating the stalk around its axis during the stripping operation.

15. In a machine of the class described, the combination with a frame, of stripper mechanism thereon comprising a plurality of pairs of intermeshing helical members located one pair above the other, means for rotating said helical members in opposite directions toward the bottom of the stalk, and a pair of rollers located above the helical members and adapted to support the stalk between them by the tassel, and means for rotating the rollers in opposite directions toward the tassel end of the stalk.

16. In a machine of the class described, the combination with a frame, of stripping mechanism thereon, a pair of rolls adapted to support the stalk between them and limit the downward movement thereof by engagement with the tassel, and means for rotating said rolls in opposite directions away from the bottom of the stalk.

17. In a machine of the class described, the combination with a frame, of a plurality of pairs of intermeshing helical members thereon, one pair spaced above the other, means for rotating the rollers of a pair in opposite directions downwardly and inwardly, a pair of intermeshing helical rollers above the helical members, and means for rotating said rollers in opposite directions upwardly and inwardly.

18. In a machine of the class described, the combination with a frame, of stripping mechanism thereon, and means for rotating the stalk during the stripping operation including a frictional engaging member located in the path of the stalk.

19. In a machine of the class described, the combination with a frame, of stripping mechanism thereon, and means for rotating the stalk during the stripping operation including a serrated member located in the path of the stalk.

20. In a machine of the class described, the combination with a frame, of stripping mechanism thereon, and means for rotating the stalk during the stripping operation including a plurality of serrated bars located in the path of the stalk.

21. In a machine of the class described, the combination with a frame, of stripper mechanism thereon, and means for rotating the stalk during the stripping operation, including a serrated bar constructed to yieldingly engage the stalk.

22. In a machine of the class described, the combination with a frame, of stripper mechanism thereon, means for rotating the stalk during the stripping operation, including a serrated bar provided with hubs, and a support provided with inclined slots with which the hubs engage.

23. In a machine of the class described, the combination with a frame, of stripping mechanism thereon including a member constantly in engagement with the stalk during the stripping operation, a yielding serrated bar engaging the stalk, and means for moving the stalk along said bar.

24. In a machine of the class described, the combination with a frame, of stripping mechanism thereon including a pair of helical intermeshing members forming a passage for the stalks, a serrated bar yieldingly pressed toward the line of bite of the members so as to engage the stalk, and means for moving the stalk through the machine along the serrated bar.

25. In a machine of the class described, the combination with a frame, of stripping mechanism thereon, and means for moving the stalk lengthwise with respect to the stripping mechanism during the stripping operation, including an upwardly inclined elevator which engages the bottom of the stalks.

26. In a machine of the class described, the combination with a frame, of stripping mechanism thereon, and means for moving the stalk lengthwise during the stripping operation including a stationary upwardly inclined platform, and an upwardly inclined elevator which engages the bottom of the stalks, and means for moving the stalks through the machine.

27. In a machine of the class described, the combination with a frame, of stripping mechanism thereon, a pair of rolls for engaging the top and supporting the stripped stalks, and means for rotating said rolls inwardly and upwardly.

28. In a machine of the class described, the combination with a frame, of stripping mechanism thereon, a pair of rolls for engaging the top and supporting the stripped stalks, means for rotating said rolls inwardly and upwardly, and an upwardly inclined elevator engaging the bottom of the stalks and elevating them within the bite of rolls.

29. In a machine of the class described, the combination with a frame, of a top cutter thereon, means for feeding the stalks to the cutter including a pair of rolls for supporting the stalk by the top, said mechanism being constructed and arranged to cut the stalk at a uniform distance below the top irrespective of the lengths of the stalks.

30. In a machine of the class described, the combination with a frame, of a top cutter thereon, means for feeding the stalks to the cutter including a pair of inwardly and upwardly rotating rolls for supporting the stalks by the top, said mechanism being constructed and arranged to cut the stalk at a uniform distance below the top irrespective of the lengths of the stalks.

31. In a machine of the class described, the combination with a frame, of a top cutter thereon, means for feeding the stalks to the cutter including a pair of rolls for supporting the stalks by the top, means for elevating the stalk into the bite of the rolls, and means for feeding the stalks through the machine, whereby the stalk is cut a uniform distance below the top irrespective of the length of the stalk.

32. In a machine of the class described, the combination with a frame, of a pair of inwardly and outwardly rotating rolls thereon constructed to feed the stalks through the machine and to support them by the top, an elevator for elevating the stalks lengthwise into the bite of the rolls, a pair of rolls axially alined with the first rolls, and constructed to receive the stalks from the first rolls, a cutter located below the second pair of rolls, said second pair of rolls being constructed to feed the stalks to the cutter.

33. In a machine of the class described, the combination with a frame, of a cutter thereon for cutting the tops from the stalks, a pair of rolls located above the knife and adapted to feed the stalks to the knife, and a doffer wheel located above the rolls for discarding the tops.

34. In a machine of the class described, the combination with a frame, of stripping means thereon including a pair of intermeshing edged helical members forming a passage for the stalk, and a supporting bridge or platform for supporting the stalk during the stripping operation, said platform being of V-shaped cross section to center the stalk.

In testimony whereof I affix my signature in presence of two witnesses.

AUGUST GERDES.

Witnesses:
H. M. JOURNEE,
M. WHITNEY.

---

Copies of this patent may be obtained for five cents each, by addressing the "Commissioner of Patents, Washington, D. C."